318. ELECTRICITY, MOTIVE POWER SYSTEMS

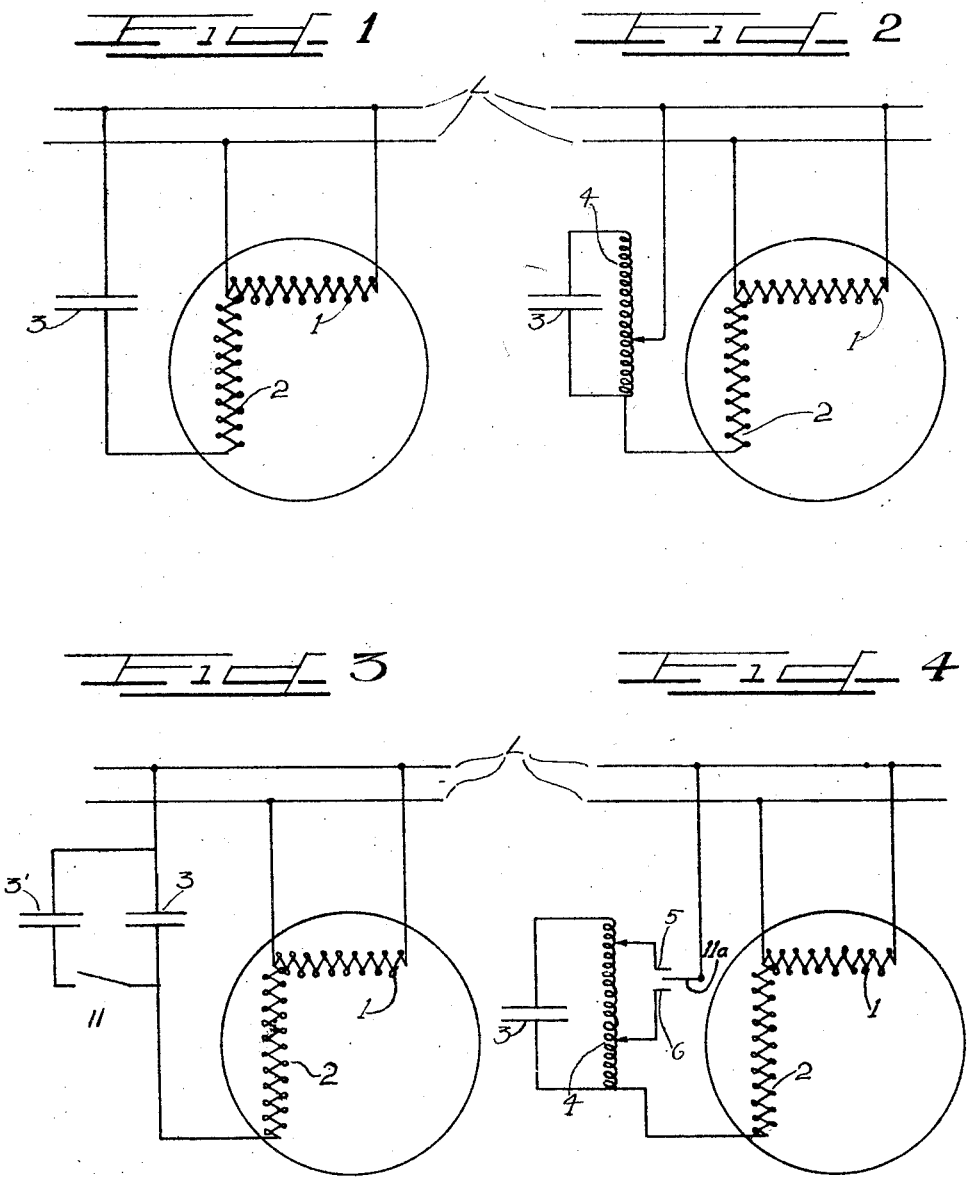

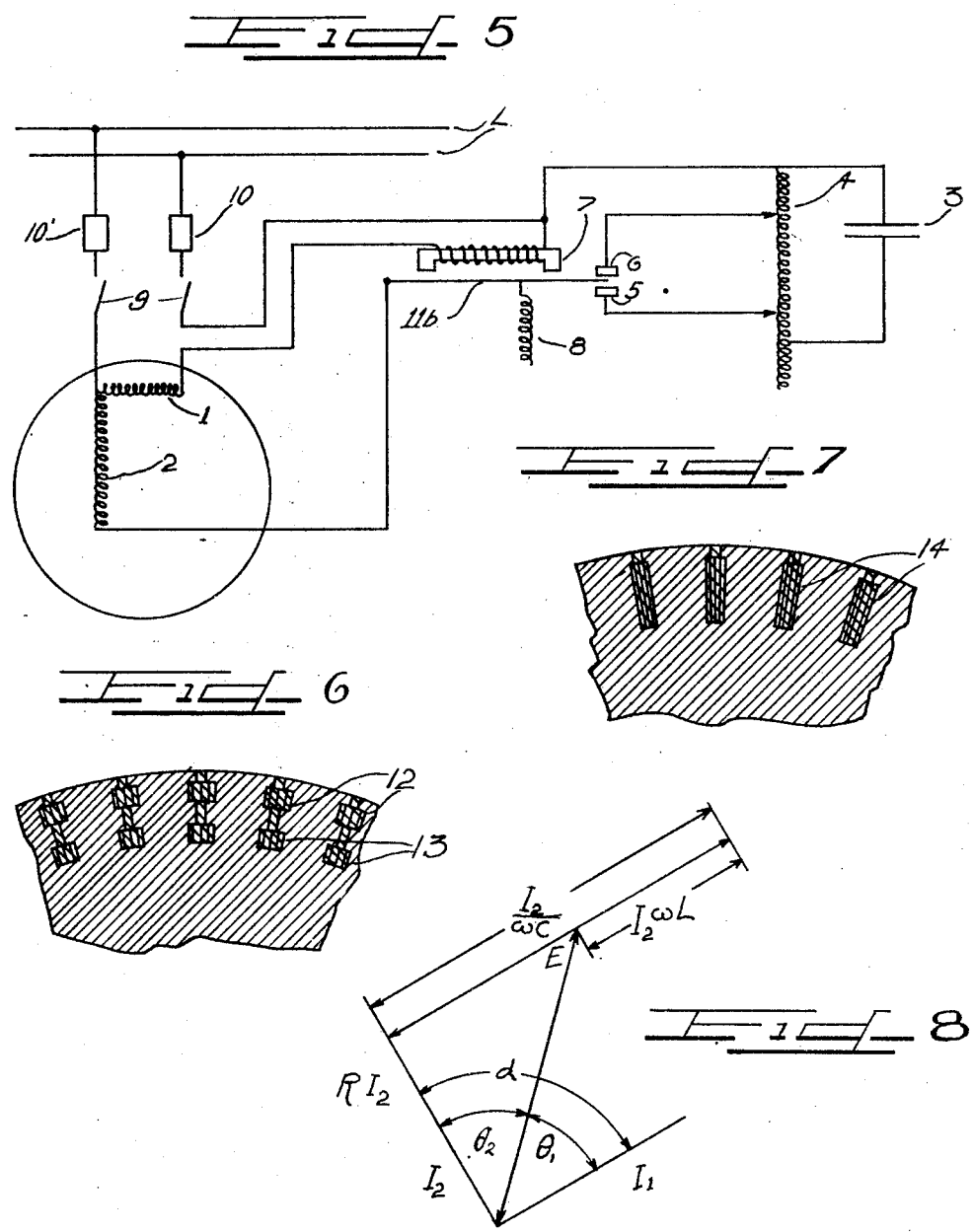

Patented Apr. 2, 1929.

1,707,423

UNITED STATES PATENT OFFICE.

BENJAMIN F. BAILEY, OF ANN ARBOR, MICHIGAN, ASSIGNOR TO REGENTS OF THE UNIVERSITY OF MICHIGAN, A CORPORATION OF MICHIGAN.

ELECTRIC MOTOR.

Application filed July 13, 1925. Serial No. 43,100.

The present invention relates to an electric motor of the induction type which is designed to efficiently operate from single phase alternating electric current.

In motors of this type as heretofore generally provided, the torque at starting has been objectionably low and where special windings have been provided to overcome this objection the motors so provided have been expensive and necessarily operated at a low power factor.

It is an important object, therefore, of the present invention to provide a single phase induction motor which effectively overcomes such disadvantages.

It is a further object of this invention to provide a single phase motor designed to give high starting torque and which is provided with auxiliary means associated with the primary winding to increase the power factor.

It is also an important object of this invention to provide a motor of the kind described having a properly designed condenser associated with the primary winding for the purpose specified.

It is a further object of this invention to provide a single phase induction motor having concentrated capacitance associated with a primary winding and provided with means for varying the effective action of such capacitance.

It is another object of this invention to provide an induction motor wherein the rotor windings are designed to give a high starting torque and wherein means associated with the stator windings are provided for improving the low power factor resulting from such rotor winding.

It is finally an important object of this invention to provide a motor of the kind described which is efficient in operation under varying conditions and which is capable of being economically manufactured.

Other and further important objects of this invention will be apparent from the disclosures in the specification and accompanying drawings.

The invention—in a preferred form—is illustrated on the drawings and hereinafter more fully described.

On the drawings:

Figure 1 is a diagrammatic showing of a simple form of induction motor embodying the principles of this invention.

Figure 2 is a similar view showing a modified form of connections.

Figure 3 is a similar view showing another form of connections.

Figure 4 is a similar view showing still another form of connections.

Figure 5 is a similar view showing the complete operating connections of an induction motor embodying the principles of this invention.

Figure 6 is a fragmentary sectional view illustrating a preferred form of rotor winding for use in connection with the motor of this invention.

Figure 7 is a view similar to Figure 6 showing a modified form of rotor winding; and, Figure 8 is a vector diagram, which will be referred to in connection with a mathematical discussion to be set forth hereinafter.

As shown on the drawings:

The simplest form of motor embodying the principles of the present invention is illustrated in Figure 1. The motor itself is provided with two primary windings which are designated by the reference numerals 1 and 2, respectively. The armature or rotor is ordinarily of the squirrel cage type but a wound rotor or other type might, of course, be employed, if desired. The winding 1 is connected directly across the supply line, which in all cases I have designated by the reference character "L". A condenser 3 is connected in series with winding 2 and the combination of said condenser 3 and winding 2 is connected across the line L.

The current in winding 1 will lag by a large angle behind the electromotive force. By using a condenser 3 of suitable capacitance the current in winding 2 may, of course, be made to lead the line voltage. The two currents can be made to differ approximately ninety degrees in phase. In this case the motor will operate in substantially the same way as a two-phase motor.

In order to secure the best possible running and starting conditions it may be desirable that the number of turns of wire in the two windings be different, as will be pointed out in detail hereinafter.

In low potential systems the cost of the condenser, if used as shown in Figure 1, is often prohibitive. This difficulty may be obviated, however, by the use of an auto-transformer, such as is shown at 4 in Figure 2, to operate the condenser at a high potential. An ordinary transformer could obviously be used instead of the auto-transformer 4, but would usually be more expensive.

A motor as connected in Figure 1 or Figure 2, however, is often objectionable in that if the condenser is sufficiently large to give adequate starting torque, it is too large when the motor is running at normal speed. The current in the winding 2 may under such condition be excessive and the motor may operate at a low power factor with a leading current.

In Figure 3 I have shown one way to obviate this difficulty by the use of two condensers, 3, and 3', and have added switch 11 so that the circuit of the condenser 3' may be opened after the motor has reached normal speed. The opening of this switch 11 may be effected manually or automatically in a manner that will be referred to hereinafter.

In the connections shown in Figure 4, at starting the switch 11ª is closed on the contact 6. The condenser 3 would, therefore, take a large current as the ratio of the auto-transformer 4 would be high with such a connection. When the motor reaches normal speed the switch 11ª is shifted to the contact 5, thus reducing the current in the condenser and improving the operation of the motor.

It will be obvious that it may be desirable to bring out a number of taps on the auto-transformer 4 or to make the same otherwise variable as indicated diagrammatically in Figures 4 and 5 in order that the voltages when starting and when running may be adjusted to give the best conditions. It may even be desirable under certain conditions that the transformer should step down the potential when the motor is in normal running condition instead of stepping up.

In Figure 5 I have indicated the complete operating connections of one form of motor of this invention. The line fuses are indicated by reference numerals 10 and 10' and the line switch by the reference numeral 9. The operation of a switch 11ᵇ has been made automatic by providing an electro-magnet 7 in series with the winding 1 and by providing a spring 8 connected to the switch 11ᵇ to pull the same downward. When starting the motor the current in the winding 1 will be large and the electro-magnet 7 being strongly energized thereby will pull the switch 11ᵇ upwardly into contact with a terminal 6 against the action of the spring 8. When the motor has reached normal speed the current in the winding 1 will, of course, drop and the electro-magnet will become sufficiently deenergized so that the spring 8 can pull the switch 11ᵇ out of contact with the member 6 and into contact with the contact member 5.

It will, of course, be apparent that a centrifugal switch of any usual design mounted on the rotor may be employed to change the connections in the manner indicated in Figures 3, 4 and 5.

The combination of the above-described motor with a rotor having a double squirrel cage winding of the general type shown in Figure 6, offer great advantages. In windings of this type one of the rotor windings 12 is of high resistance and low reactance and is situated near to the outer periphery of the rotor. The other winding 13 is of low resistance, but is situated in slots deep in the rotor core and therefore has a high reactance. In Figure 7 I have shown another rotor winding having these general characteristics, comprising a deep narrow winding 14 as distinguished from a usual shallow winding of greater width.

It is well-known that polyphase motors having rotors of this type start with excellent torque and operate at good efficiency at normal speed. They, however, suffer from the disadvantage that the power factor during normal operation is low. It will be obvious that such a rotor can be advantageously employed with the structure which I have shown herein. The starting torque will be excellent and the fact that the power factor would normally be low may be obviated by using a slightly higher potential on the condenser whereby the power factor may be made unity or the current even made to lead.

Using an auto-transformer of the type shown at 4 as shown in Figures 4 and 5 has the advantage that the potential applied to the condenser during normal running is low. By virtue of this construction it is not necessary to insulate the condenser as well or with as great care as would be necessary if it were subjected to continuous high potential.

Having fully disclosed the electrical connections including the various forms of the motor of this invention I will now set forth certain computations whereby I have determined general formulæ which should be of value to those skilled in the art in the practice of my invention.

In this mathematical discussion it is assumed that the number of turns in winding 1 and winding 2 is not necessarily the same. It is, however, assumed that the distribution of the winding and the method of connection is the same, and that the cross section of the conductors employed is such that the weight of copper in the two windings is the same.

Let $R$, $X$ and $Z$ be respectively the resistance, reactance and impedance of winding 1, as measured with alternating currents of normal frequency with the rotor locked. $R$ is then the equivalent locked resistance, $X$ the standstill reactance and $Z$ the standstill impedance. Let $R_2$, $X_2$ and $Z_2$ be the similar values for winding 2.

Let $K = \dfrac{\text{Turns in winding 2}}{\text{Turns in winding 1}}$

Then $R_2 = K^2 R$, $X_2 = K^2 X$ and $Z_2 = K^2 Z$

Let $I_1$ and $I_2$ be the currents in the two windings. Let the angles of lag of the two currents be $\theta_1$ and $\theta_2$ (usually $I_2$ will lead and $\theta_2$ will be negative as shown in Fig. 2).

Let $\alpha = \theta_1 - \theta_2 =$ angle between the two currents.

The starting torque for a given rotor will be proportional to the product of the ampere turns in the two windings, and the sine of the angle between them. We may then write $T$ (torque) $= NKI_1 I_2 \sin \alpha$ in which $N$ is a constant depending upon the number of turns in winding 1, the resistance of the rotor, etc.

$$I_1 = \frac{E}{Z} = \frac{E}{\sqrt{R^2 + X^2}}$$

Let the reactance of the condenser equal $Y = \dfrac{1}{2\pi f C} = \dfrac{1}{C\omega}$ where $f$ is the frequency.

$$I_2 = \frac{E}{\sqrt{(K^2 R)^2 + (K^2 X - Y)^2}}$$

$\alpha = \theta_1 - \theta_2$, $\sin \alpha = \sin \theta_1 \cos \theta_2 - \cos \theta_1 \sin \theta_2$ $$\sin \alpha = \frac{X}{\sqrt{R^2 + X^2}} \cdot \frac{K^2 R}{\sqrt{(K^2 R)^2 + (K^2 X - Y)^2}} - \frac{R}{\sqrt{R^2 + X^2}} \cdot \frac{(K^2 X - Y)}{\sqrt{(K^2 R)^2 + (K^2 X - Y)^2}} = \frac{YR}{\sqrt{R^2 + X^2} \cdot \sqrt{(K^2 R)^2 + (K^2 X - Y)^2}}$$

Then $T = \dfrac{NE}{\sqrt{R^2 + X^2}} \dfrac{KE}{\sqrt{(K^2 R)^2 + (K^2 X - Y)^2}} \cdot \dfrac{YR}{\sqrt{R^2 + X^2} \cdot \sqrt{(K^2 R)^2 + (K^2 X - Y)^2}}$ $= \dfrac{NKE^2 YR}{K^4 (R^2 + X^2)^2 - 2 K^2 (R^2 + X^2) XY + (R^2 + X^2) Y^2}$ $= \dfrac{NKE^2 YR}{K^4 Z^4 - 2 K^2 Z^2 XY + Z^2 Y^2}$ For a given winding to determine the capacitance of the condenser to give the greatest torque, differentiate with respect to $Y$ and place the result equal to zero, $$\frac{dT}{dY} = \frac{NKE^2 R(K^4 Z^4 - 2 K^2 Z^2 XY + Z^2 Y^2) - (2 Z^2 Y - 2 K^2 Z^2 X) NKE^2 YR}{(K^4 Z^4 - 2 K^2 Z^2 XY + Z^2 Y^2)^2} = O$$

On simplifying $Y = \pm K^2 Z$ we may disregard the negative value. Substituting for $Y$ we get $$C = \frac{1}{K^2 Z \omega} = \frac{1}{2\pi f Z K^2}$$

The E. M. F. applied across the condenser is usually greater than the line voltage $E$ and is given by the formula $$E_c = \frac{I_2}{C\omega}$$

If we assume that we have the value of the capacitance giving the greatest torque for a given ratio of turns, we have $Y = K^2 Z$.

Substituting this value in the expression for torque we have (letting $T_M =$ maximum torque for a given $K$)

$$T_M = \frac{NK^3 E^2 ZR}{2 K^4 Z^4 - 2 K^4 Z^3 X} = \frac{N}{2K}\left(\frac{E}{Z}\right)^2 \cdot \frac{R}{Z - X} = \frac{N}{2K} I_1^2 \frac{R}{Z - X}$$

From the above we reach the important conclusion that assuming other conditions constant and within practical limits we can increase the torque to any value we desire by decreasing the number of turns in the winding in series with the condenser. The value of the capacitance must, of course, be increased as the number of turns is decreased. Large values of torque are accompanied by the large currents in the winding 2.

We can also put the expression for maximum torque for a given $K$ in the form $$T_M = \frac{N}{2K}\left(\frac{E}{Z}\right)^2 \cdot \frac{\sqrt{Z^2 - X^2}}{Z - X} = \frac{N}{2K} I_1^2 \sqrt{\frac{Z + X}{Z - X}}$$

In a two-phase motor the two currents are equal and at right angles. Therefore the torque of a two-phase motor is $T_2 = NI_1^2$ and we have $$\frac{\text{Torque of single phase motor}}{\text{Torque of two-phase motor}} = \frac{1}{2K}\sqrt{\frac{Z+X}{Z-X}}$$

It will be apparent that the single phase motor may have a much greater torque than the two phase motor. In practice $X$ and $R$ are frequently nearly equal and $$Z = (\text{about}) \; 1.41 \, X.$$

Assuming these values and substituting we have $$\text{Torque ratio} = \frac{1.21}{K}$$

$$\frac{dT}{dK} = \frac{NE^2YR(K^4Z^4 - 2K^2Z^2XY + Z^2Y^2) - (4K^3Z^4 - 4KZ^2XY)NKE^2YR}{(K^4Z^4 - 2K^2Z^2XY + Z^2Y^2)^2} = 0$$

or $3K^4Z^2 - 2K^2XY - Y^2 = 0$

Solving for $K^2$ $$K^2 = \frac{Y}{3Z^2}(X \pm \sqrt{X^2 + 3Z^2})$$

*Angle between phases with maximum starting torque.*

Other things being equal, the best starting torque would be obtained when the two currents were at right angles. By making the angle less than ninety degrees, however, the current in winding 2 can be greatly increased and this increase more than makes up for the Thus with these assumed values the single phase motor would have a torque 21 per cent greater than the two phase motor if the phases were alike ($K=1$). By using fewer turns in the winding 2, the torque of the single phase motor could be made much greater.

To find the best value of the ratio $K$ assuming a fixed value of $C$ and consequently of $Y$ $$T = \frac{NKE^2YR}{K^4Z^4 - 2K^2Z^2XY + Z^2Y^2}$$

Differentiating with respect to $K$ and putting the result equal to zero, fact that the currents are not at right angles.

Substituting the value $Y = K^2Z$ in the formula for $\sin \alpha$ we have, $$\sin \alpha = \frac{K^2ZR}{Z\sqrt{(K^2R)^2 + (K^2X - K^2Z)^2}} = \sqrt{\frac{Z+X}{2Z}}$$

Since in practice $X$ is always less than $Z$, $\alpha$ will be less than ninety degrees.

*Voltage applied to the condenser.*

It is important to note that with the condition of greatest starting torque the voltage applied to the condenser does not vary with the ratio $K$. This is shown as follows:

$$\text{Condenser current} = I_2 = \frac{E}{K^2\sqrt{2Z(Z-X)}} \text{ for the condition that } Y = K^2Z.$$

$$\text{E. M. F. over condenser} = E_c = \frac{I_2}{C\omega} = I_2 Y = K^2 Z I_2 = E\sqrt{\frac{Z}{2(Z-X)}}$$

This value is independent of $K$.

*Torque per microfarad.*

With the value of capacitance giving the maximum torque, namely $$Y = K^2Z = \frac{1}{C\omega}$$

we have, $$T = \frac{NE^2R}{2KZ^2(Z-X)}$$

The torque per unit of capacitance is $$Q = \frac{T}{C} = \frac{NE^2R}{2CKZ^2(Z-X)} = \frac{KNE^2R\omega}{2Z(Z-X)}$$

It is obvious that the greater the value of $K$ the greater the torque per unit of condenser capacity. Since as we have already shown, the voltage across the condenser for the greatest torque is independent of $K$ it follows also that the torque per k. v. a. of the condenser will be greater, the greater the value of $K$.

$K$ should, therefore, be as great as possible and still give the required starting torque, in other words we should use as many turns as possible in winding 2.

It will thus be apparent that I have provided a single phase induction motor which is capable of giving excellent starting torque and which is further capable of efficient operation at a high power factor. It will be noted that the structure is extremely simple and that there are no parts which are likely to get out of order or to be easily injured.

I am aware that numerous details of construction may be varied through a wide range without departing from the principles of this invention, and I therefore do not purpose

I claim as my invention:

1. In a single phase induction motor, a stator having two windings, a condenser permanently associated with one of said windings, and means external to the windings for automatically temporarily increasing the voltage applied to the condenser when the motor is started.

2. In a single phase induction motor, a stator having two windings, a condenser associated with one of said windings, and means external to the windings for automatically decreasing the voltage applied to the condenser after the motor has attained normal speed.

3. In a single phase induction motor, a stator having two windings, a reactor in series with one of said windings, a condenser in parallel with the reactor, and means comprising a switch in operative association with the reactor to decrease the voltage impressed upon the condenser when the motor attains normal speed.

4. In a motor of the kind described, a stator winding directly connected to a source of power, another stator winding having a different number of turns than the first stator winding, a condenser connected in series with only one of said windings and to the power line, and means whereby the effective capacitance of the condenser may be varied.

5. In a motor of the kind described, a stator winding directly connected to a source of power, a second stator winding, a condenser connected in series with only one of said windings and to the power line, and means whereby the effective capacitance of the condenser may be varied.

In testimony whereof I have hereunto subscribed my name.

BENJ. F. BAILEY.